United States Patent
Matsunami

(10) Patent No.: US 12,491,804 B2
(45) Date of Patent: Dec. 9, 2025

(54) VEHICLE SEAT

(71) Applicant: TOYOTA BOSHOKU KABUSHIKI KAISHA, Aichi-ken (JP)

(72) Inventor: Nobutaka Matsunami, Aichi-ken (JP)

(73) Assignee: TOYOTA BOSHOKU KABUSHIKI KAISHA, Aichi-ken (JP)

( * ) Notice: Subject to any disclaimer, the term of this patent is extended or adjusted under 35 U.S.C. 154(b) by 128 days.

(21) Appl. No.: 18/630,228

(22) Filed: Apr. 9, 2024

(65) Prior Publication Data

US 2024/0343208 A1    Oct. 17, 2024

(30) Foreign Application Priority Data

Apr. 13, 2023    (JP) .................. 2023-065473

(51) Int. Cl.
| | |
|---|---|
| *B60N 2/60* | (2006.01) |
| *B60N 2/01* | (2006.01) |
| *B60N 2/22* | (2006.01) |
| *B60N 2/36* | (2006.01) |
| *B60R 13/02* | (2006.01) |

(52) U.S. Cl.
CPC ............ *B60N 2/60* (2013.01); *B60N 2/01* (2013.01); *B60N 2/22* (2013.01); *B60N 2/36* (2013.01); *B60R 13/0275* (2013.01)

(58) Field of Classification Search
CPC .................................. B60N 2/36; B60N 2/60
See application file for complete search history.

(56) References Cited

FOREIGN PATENT DOCUMENTS

CN         110758198         2/2020

*Primary Examiner* — Nicholas McFall
(74) *Attorney, Agent, or Firm* — Greenblum & Bernstein, P.L.C.

(57) ABSTRACT

A vehicle seat, in which a seat back configured to be superimposed on a seat cushion by folding forward, comprises a shield and a cover member. The shield hides the end of a first rotating shaft that rotates the seat back with respect to the seat cushion. The cover member is flexible and has a plate-shape. The cover member is arranged on a corner portion of the back cover of the seat back in order to hide the shield from the front. The cover member has an elastic member extending from a lower end of the cover member. The elastic member is hooked to the shield. The elastic member is provided between the cover member and the shield so that the elastic member remains in tension even when the seat back is superimposed on the seat cushion by folding forward.

6 Claims, 6 Drawing Sheets

VEHICLE SEAT

TECHNICAL FIELD

The present disclosure relates to a vehicle seat. More specifically, the present disclosure relates to a vehicle seat having a cover member that prevents a gap near the end of a rotating shaft of a seat back from being seen from the front.

BACKGROUND

Some vehicle seats have a seat back that can be folded forward and superimposed on a seat cushion. In such a vehicle seat, a cover member may be arranged to make a shield invisible from the front. The shield hides the end of a rotating shaft for rotating the seat back with respect to the seat cushion. In the vehicle seat described in a prior art, a cover member is arranged to hang down from the lower end of a back cover, which is a cover material of a seat back, so that the gap at the end of a rotating shaft for rotating the seat back with respect to a seat cushion invisible from the front.

SUMMARY OF INVENTION

Technical Problem

A prior art discloses the cover member is only arranged to hang down from the lower end of the back cover. When the seat back is folded forward, the cover member is folded, and when it returns to the original position, the cover member has irregular creases that damage its appearance.

The subject matter of the present disclosure is to provide a vehicle seat, in which the seat back can be superimposed on the seat cushion by folding forward, with a cover member that improves the appearance near the edge of the rotating shaft.

Solution to Problem

According to one aspect of the present disclosure, a vehicle seat, in which a seat back configured to be superimposed on a seat cushion by folding forward, comprises a shield and a cover member. The shield hides the end of a first rotating shaft that rotates the seat back with respect to the seat cushion. The cover member is flexible and has a plate-shape. The cover member is arranged on a corner portion of the back cover of the seat back in order to hide the shield from the front. The cover member has an elastic member extending from a lower end of the cover member. The elastic member is string-like. The elastic member is hooked to the shield. The elastic member is provided between the cover member and the shield so that the elastic member remains in tension even when the seat back is superimposed on the seat cushion by folding forward.

The cover member is hooked to the shield by the elastic member tensioned between the cover member and the shield. When the seat back is superimposed on the seat cushion by folding forward, the cover member is in a state of tension by the elastic member. Therefore, the cover member is not likely to be bent, and creases do not occur. Even if creases occur, the creases will be smoothed out when the seat back returns to its original position. Therefore, the appearance of the cover member from the front can be prevented from being damaged. The appearance of the vehicle seat is preserved and improved.

According to another aspect, the vehicle seat has the shield and a link member. A second rotating shaft is provided with the seat back at the position above the shield and extends in the seat width direction. One end of the link member is rotatably supported by the second rotating shaft. The other end of the link member is connected to the seat cushion. Thereby, the vehicle seat is configured to be tilt-down. Tilt down refers to a state in which the seat back is folded forward and the seat cushion is sunk forward and downward to store the seat back and the seat cushion in an overlapping manner. The cover member is arranged at the corner portion of the back cover of the seat back so as to cover the corner portion where the shield and the link member are arranged.

The lower end of the cover member, which hides the shield and the link member invisibly from the front, is hooked to the shield by a string-like elastic member tensioned between the shield and the cover member. When the seat back is folded forward and the seat cushion is sunk forward and downward to make the seat back and the seat cushion in an overlapping manner, the cover member is in a state of tension by the elastic member. Therefore, the cover member is not likely to be bent and creases do not occur. Even if creases occur, the creases will be smoothed out when the seat back returns to its original position. Therefore, the appearance of the cover member from the front is not damaged preserving its appearance.

According to another aspect, the cover member is formed by placing a flexible core material and a part of the elastic member inside the folded cover material and sewing the outer circumference of the folded cover material.

Since the flexible core material is placed inside the cover member, it is easier to maintain a flat shape and less likely to crease or wrinkle. Even if creases occur, the creases will be smoothed out when the seat back returns to its original position. In addition, the elastic member can be attached easily by sewing around the outer circumference of the cover material with a part of the elastic member placed inside the folded cover material.

According to another aspect, two vehicle seats are arranged side by side in the seat width direction. The cover member of each vehicle seat is arranged at each of the corner portions of the adjacent seat backs.

The corner portions of seat backs of two vehicle seats arranged side by side are each covered with the cover member. Therefore, both vehicle seats have a good appearance because the shield or the shield and the link member are hided invisibly from the front.

EMBODIMENTS FOR CARRYING OUT THE INVENTION

An embodiment of the present disclosure is shown with reference to FIGS. 1 to 7. The embodiment is an example of the invention applied to a 6-side seat 2 and a 4-side seat 3 for a vehicle rear seat 1. In each figure, arrows indicate the respective directions when the vehicle rear seat 1 is mounted on the vehicle. In the following description, the description regarding the direction shall be based on this direction. The right and left directions correspond to the seat width direction.

Figure 1:
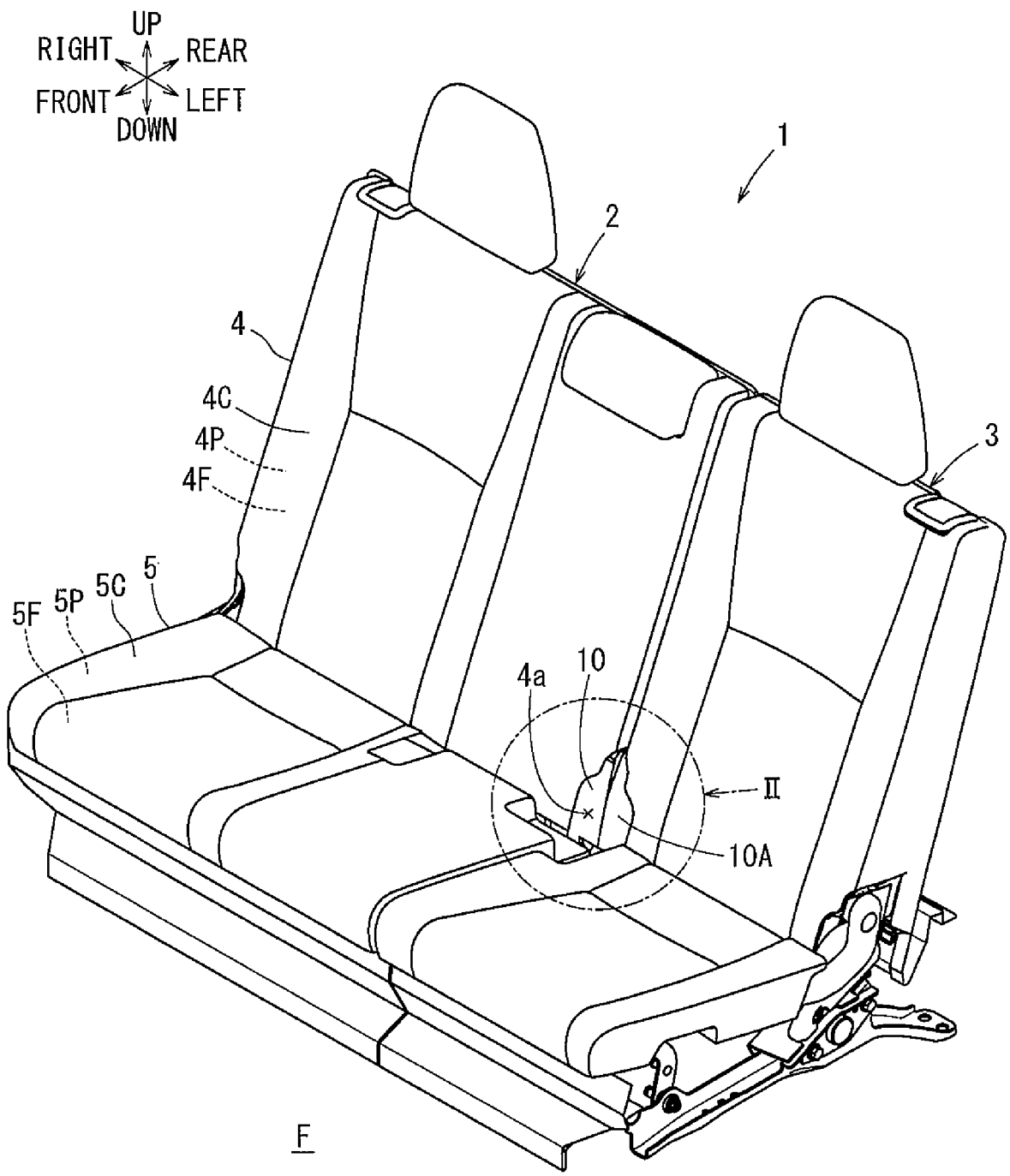
FIG. 1 is a perspective view of a seat back for a vehicle rear seat according to an embodiment, viewed from diagonally forward.

As shown in FIG. 1, the vehicle rear seat 1 is a type of vehicle rear seat which is divided 6:4 in the seat width direction. The vehicle rear seat 1 has a 6-side seat 2 that can accommodate two persons and a 4-side seat 3 that can accommodate one person. The 4-side seat 3 is arranged side by side to the left of the 6-side seat 2. The portion of the 6-side sheet 2 where a cover member 10 is arranged and the portion of the 4-side sheet 3 where a cover member 10A is arranged are symmetrical with respect to the right-left boundary of both sheets. Therefore, the 6-side sheet 2 is described as representative, and the description of the 4-side sheet 3 is omitted. The 6-side seat 2 and the 4-side seat 3 correspond to the "vehicle seat" in the claims, respectively.

Figure 2:
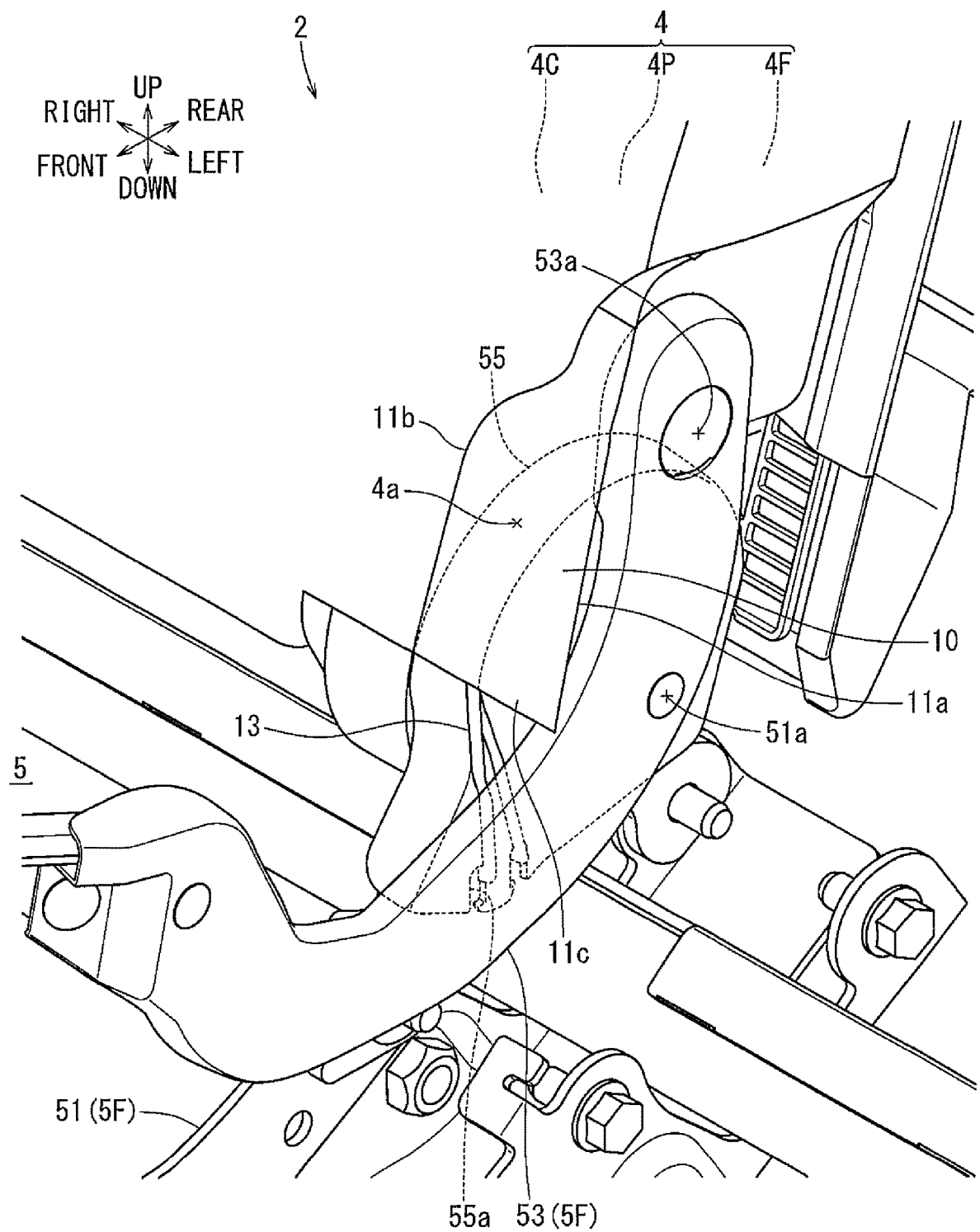
FIG. 2 is an enlarged view of part II of the rear seat of FIG. 1, omitting a 4-side seat.
Figure 3:
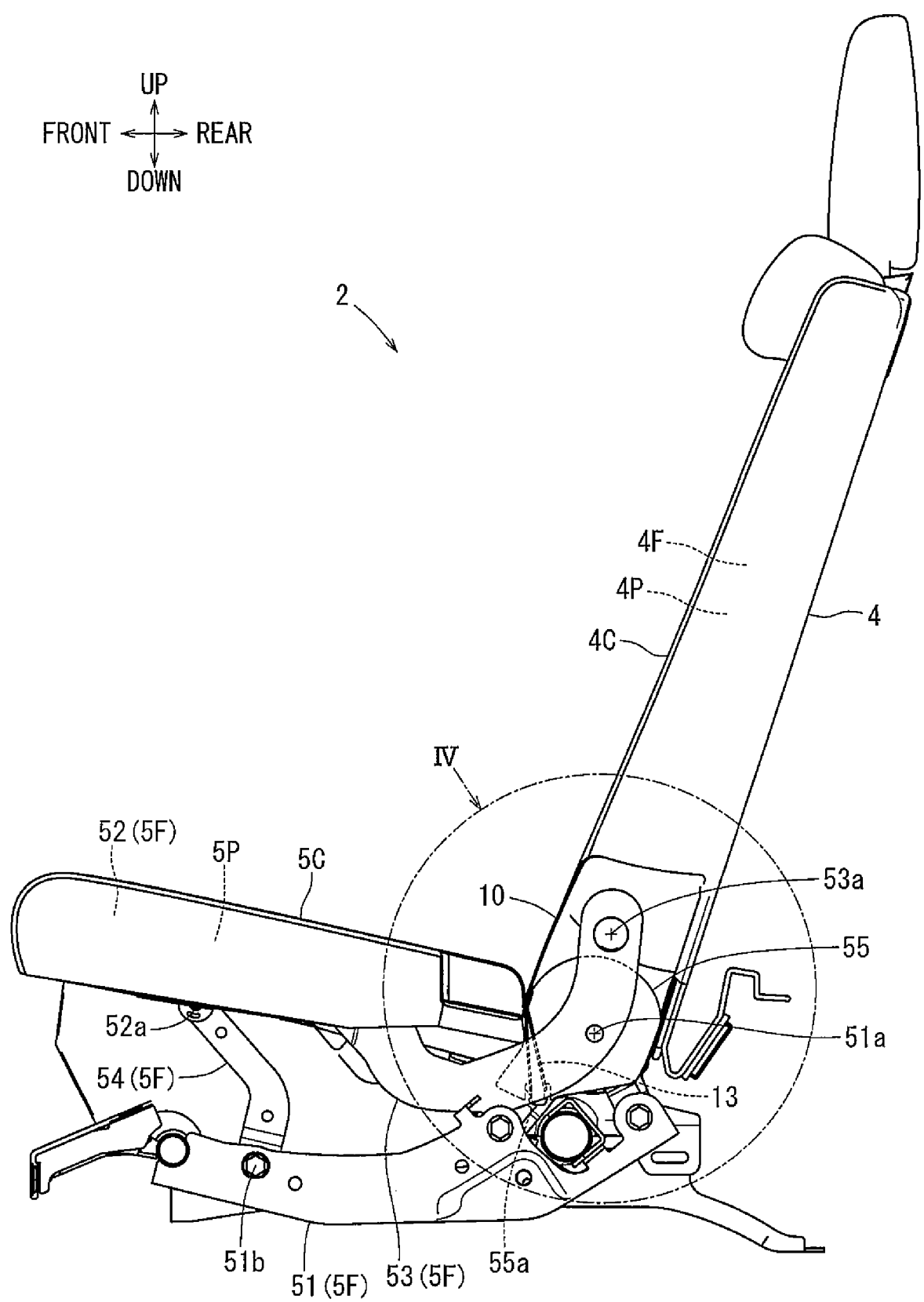
FIG. 3 is a side view of a 6-side seat of the rear seat of FIG. 1.

As shown in FIGS. 1 to 3, the 6-side seat 2 has a seat back 4 and a seat cushion 5. The seat back 4 serves as a backrest for the center-side seated occupant and the outer-side seated occupant. The seat cushion 5 serves as a seating portion for the center-side seated occupant and the outer-side seated occupant. The seat back 4 has a back frame 4F that forms a framework, a back pad 4P that is a cushion material, and a back cover 4C that is a cover material. The back pad 4P is covered over the back frame 4F to form the external shape of the seat back 4. The back cover 4C is made of multiple pieces that are sewn together to form a three-dimensional shape. The back cover 4C is covered over the back pad 4P. The seat cushion 5 has a cushion frame 5F that forms a framework, a cushion pad 5P that is a cushion material, and a cushion cover 5C that is a cover material. The cushion pad 5P is covered over a pad support frame 52 of the cushion frame 5F to form the external shape of the seat cushion 5. The cushion cover 5C is made of multiple pieces that are sewn together to form a three-dimensional shape. The cushion cover 5C is covered cover the cushion pad 5P.

Figure 4:
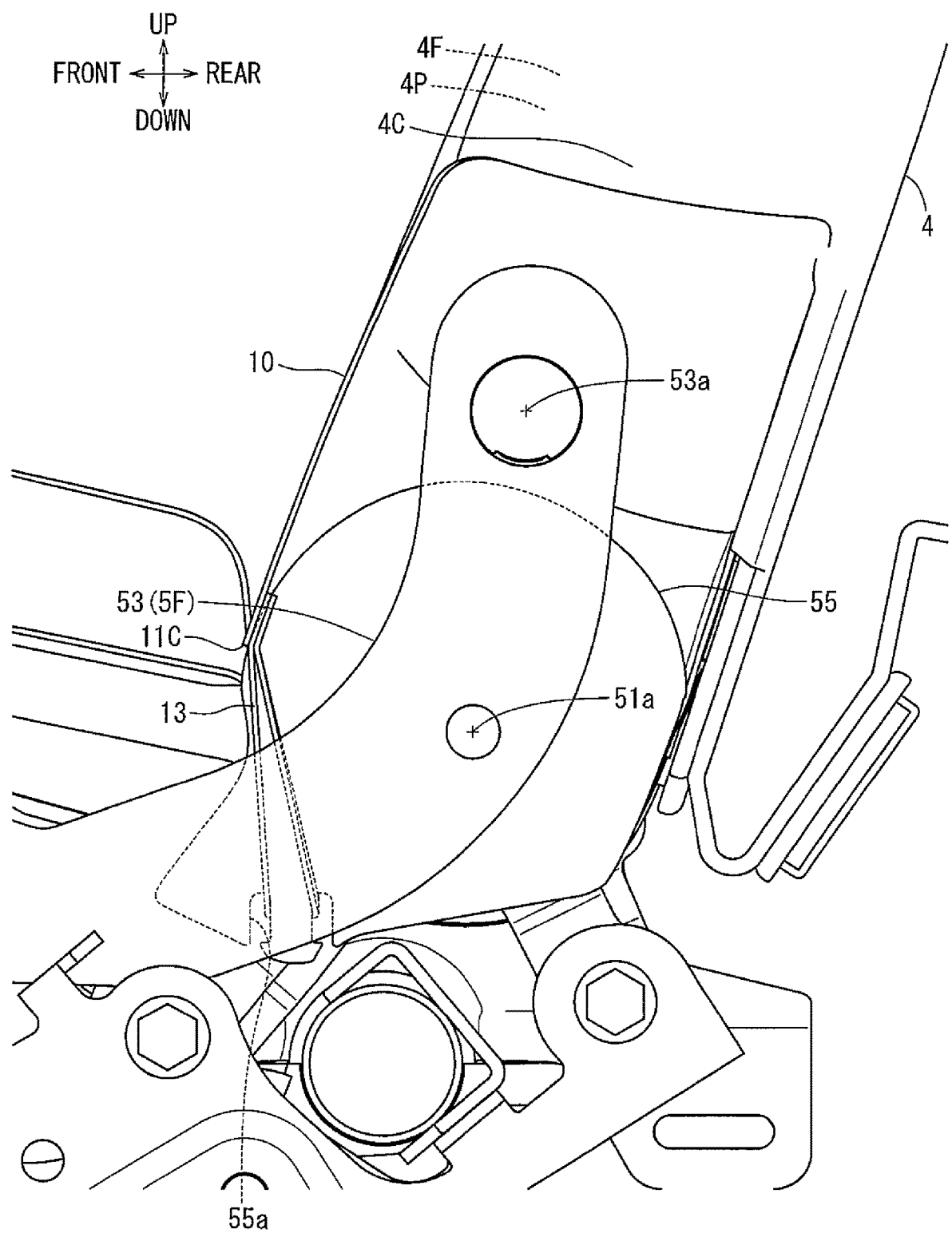
FIG. 4 is an enlarged view of part IV of FIG. 3.

As shown in FIGS. 1 to 3, the cushion frame 5F has a base frame 51 fixed to a floor F, the pad support frame 52, an arm member 53 (a rear link member), and a front link member 54. The back frame 4F is attached to the rear upper portion of the base frame 51. The base frame 51 has a first rotating shaft 51a extending in the right-left direction. The back frame 4F is rotatable around the first rotating shaft 51a. The pad support frame 52 is a frame that supports the cushion pad 5P from below. A front end of the arm member 53, which has an arm-shape and is curved upwardly viewing from the side connects to the rear side of the pad support frame 52. As shown in FIG. 3, the front link member 54 has an L-shape viewing from the side. Further, the upper end of the front link member 54 is rotatably attached to the front lower side of the pad support frame 52 around an upper rotating shaft 52a extending in the right-left direction. The lower end of the front link member 54 is rotatably attached to the upper front side of the base frame 51 around a lower rotating shaft 51b extending in the right-left direction. The rear end of the arm member 53 is rotatably attached to the back frame 4F around a second rotating shaft 53a extending in the right-left direction. When the seat back 4 moves forward around the first rotating shaft 51a, the seat cushion 5 moves forward and downward by the action of the arm member 53 and the front link member 54. Thereby, the seat back 4 is able to store on the seat cushion 5 in an overlapping manner. The 6-side seat 2 is a seat equipped with a tilt-down mechanism. The right and left ends of the first rotating shaft 51a are covered by a shield 55. The shield 55 has a box-shape and made of plastic as shown in FIG. 4. The shield 55 opens toward the inside of the seat width direction. A hooked portion 55a is formed on the lower end of the shield 55 for hooking the lower end of an elastic strap 13 of the cover member 10 as illustrated in FIG. 4. The arm member 53 is covered with a resin cover. The arm member 53 corresponds to the "link member" in the claims.

Figure 6:
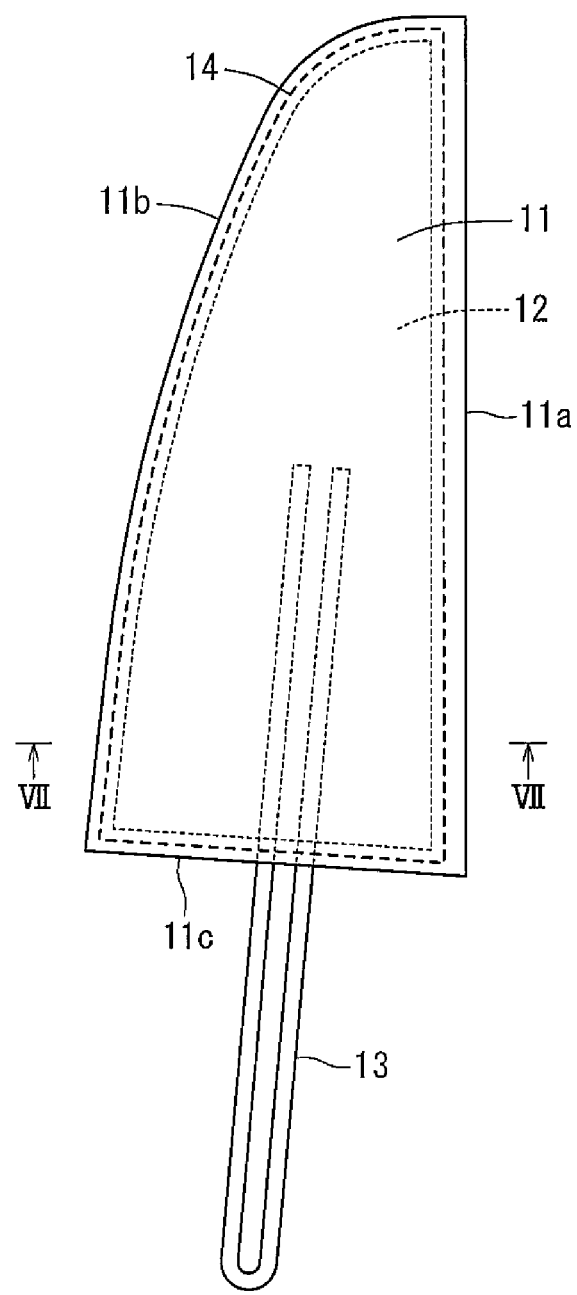
FIG. 6 is a front view of a cover member.
Figure 7:
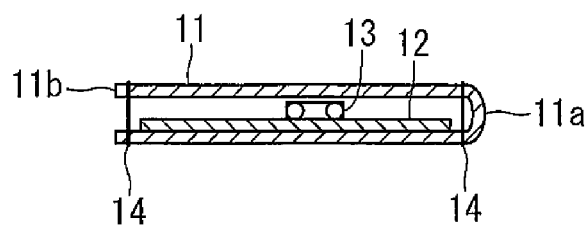
FIG. 7 is a cross-sectional view of the cover member of FIG. 6 taken along line VII-VII. The dimensions in the thickness direction are enlarged for visibility.

As shown in FIGS. 6 and 7, the cover member 10 comprises a cover material 11, a core material 12, and an elastic strap 13. The cover material 11 is the same material as the woven fabric, leather or synthetic leather used on the front side of the back cover 4C. The cover material 11, which has an approximately U-shape, is folded in two at a folded portion 11a at the center portion. The core material 12 is a flexible resin plate. The core material 12 is slightly smaller than the outer shape of the cover material 11 folded in two at the folded 30 portion 11a. The elastic strap 13 is circular in cross section and is folded in two. The core material 12 and ends of the folded elastic strap 13 is placed between the folded cover material 11. Still in FIG. 6, the elastic strap 13 is placed in a position that about half of its vertical dimension is inside of the core material 12 in the cover material 11 folded in two, with the two folded ends together and upward. In this configuration, the outer edges of the folded portion 11a, a vertical edge 11b, and a lateral edge 11c are sewn together to form a single piece. The core material 12 is not limited to be made by resin but may be made of any other material as long as it is flexible and does not bend easily. For example, carpet material with a resin coating on the reverse side may be used. The elastic strap 13 may be fixed to the back side of the core material 12 in advance by sewing or gluing. The elastic strap 13 corresponds to the "elastic member" in the claims. The lateral edge 11c corresponds to the "lower edge" of the claims.

Figure 5:
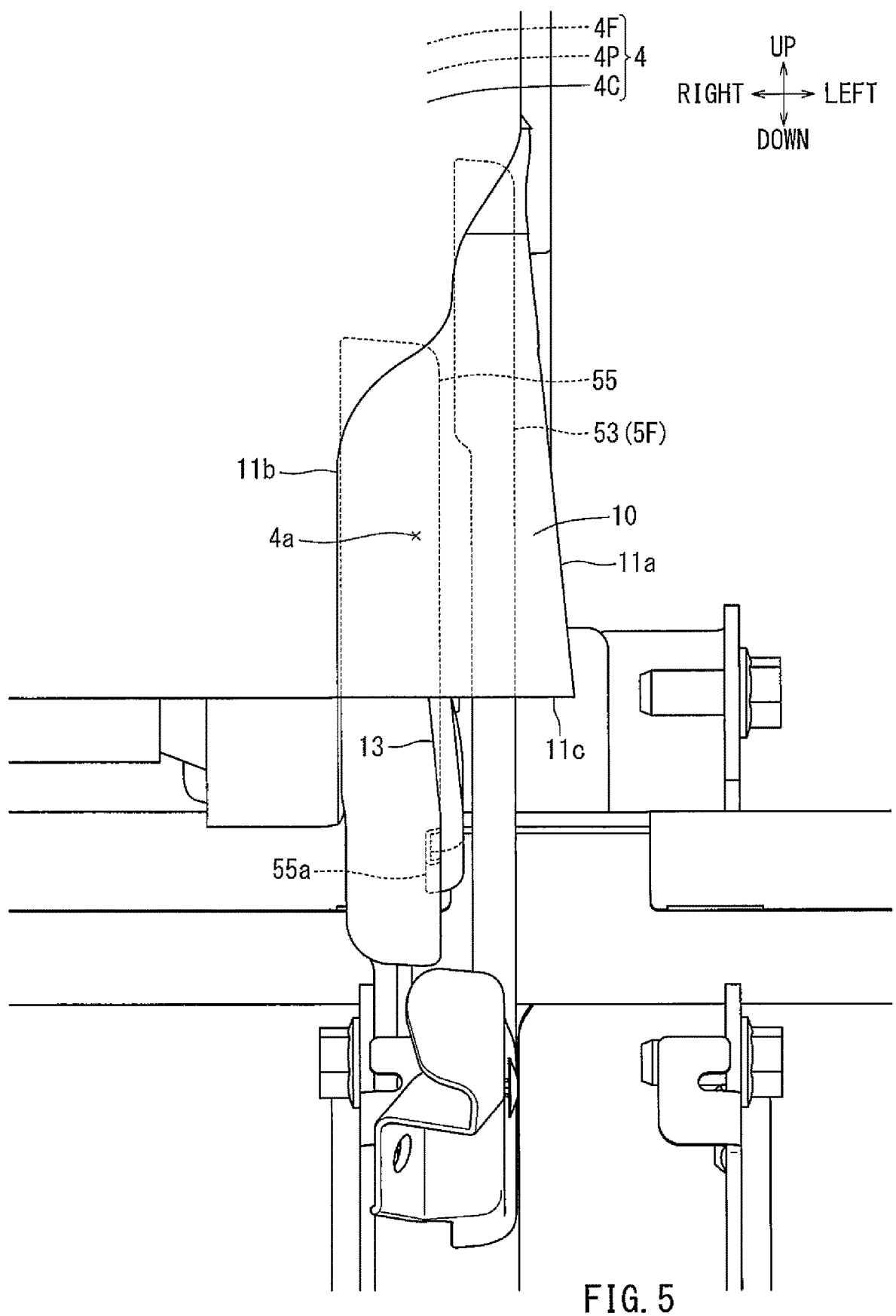
FIG. 5 is a front view of the part IV of FIG. 3.

As shown in FIGS. 2, 4 and 5, the cover member 10 is attached to the back cover 4C at a corner portion 4a that is the left lower portion of the seat back 4 by sewing the vertical edge 11b. FIG. 4 shows that the cover member 10 attached to the back cover 4C is engaged to the shield 55 by the lower loop of the elastic strap 13, which is extended and hooked to the hooked portion 55a of the shield 55. The lateral edge 11c of the cover member 10 is therefore always pulled in the direction of the hooked portion 55a, during the seat back 4 is erected against the seat cushion 5 to the seat back is folded forward and overlapped against the seat cushion 5. The folded portion 11a is located on outside the seat width direction, which is the left side of the corner portion 4a. Since the cover member 10 covers the corner portion 4a from the front, the shield 55 and arm member 53 are not visible from the front.

FIG. 1 shows that a portion of the 6-side sheet 2, in which cover member 10 is arranged, and a portion of the 4-side sheet 3, in which cover member 10A is arranged, are symmetrical with respect to the right-left boundary of both sheets. Therefore, the cover member 10A of the 4-side seat 3 has the same configuration with the cover member 10 of the 6-side seat 2. Since the cover member 10A covers the lower right corner of the seat back of the 4-side seat 3 from the front, the shield 55 and the arm member 53 are not visible from the front.

The embodiment configured as described above has the following advantageous effects. The lateral edge 11c of the cover member 10, which covers the shield 55 and the arm member 53 invisibly from the front, is pulled in the direction of the hooked portion 55a of the shield 55 by the elastic strap 13 stretched between the shield 55 and the cover member 10. Therefore, when the seat back 4 is folded forward and the seat cushion 5 is sunk forward and downward to store the two in an overlapping manner, the cover member 10 is pulled by the elastic strap 13. Thereby, the cover member 10 is less likely to be bent and creases are less likely to occur. Even if a crease does occur, the crease will be smoothed when the seat back 4 is returned to its original position. This prevents damage to the appearance of the cover member 10 from the front. Therefore, the appearance of the 6-side seat 2 is not damaged and preserved.

As shown in FIGS. 5 and 6, the cover member 10 is formed by placing the core material 12 and the upper end of the folded elastic strap 13 inside the folded cover material 11 and sewing the outer circumference with the sewing line 14. Since the flexible core material 12 is placed inside the cover member 10, it is easy to maintain a flat form and is less likely to crease. Even if creases occur, the creases will be smoothed out when the seat back is returned to its original position. In addition, when attaching the elastic strap 13, it is easy to work with because the outer circumference of the cover material 11 can be sewn while the upper end of the folded elastic strap 13 is placed inside the folded cover material 11.

The 6-side seat 2 and the 4-side seat 3 are arranged side by side in the seat width direction. The cover member 10 is arranged on the corner portion 4a of the seat back 4 of the 6-side seat 2. The cover member 10A is arranged on the corner portion of the seat back of the 4-side seat 3. The corner portions of the adjacent seat backs of the 6-side seat 2 and the 4-side seat 3 are covered with the cover member 10 and the cover member 10A, respectively. Therefore, the shields 55 and arm members 53 of the 6-side seat 2 and 4-side seat 3 are invisible from the front. The appearance of the vehicle seat can be improved.

Although a certain embodiment has been described above, the present disclosure is not limited to the configuration, and various changes, additions, and deletions are possible to the extent that they do not alter the gist of the invention. For example, the following are examples.

1. According to the above embodiment, the 6-side seat 2 and the 4-side seat 3 are each equipped with shield 55 and arm member 53, respectively, and are seats that can be tilted down. However, the present disclosure is not limited to the above configuration, and the seat may be equipped with only the shield 55 and the seat back 4 can be folded forward.

2. According to the above embodiment, the elastic strap 13 with a circular cross section was used as the elastic member. However, the present disclosure is not limited to the above configuration, and a tape-like flat rubber with a flat cross section may be used, or a linear elastic material made of resin may be used.

3. According to the above embodiment, the present disclosure is applied to the rear seat 1 for an automobile. However, the present invention is not limited to, and may be applied to seats mounted on aircraft, ships, trains, etc.

The various examples described above in detail with reference to the attached drawings are intended to be representative of the present disclosure and are thus non-limiting embodiments. The detailed description is intended to teach a person of skill in the art to make, use and/or practice various aspects of the present teachings, and thus does not limit the scope of the disclosure in any manner. Furthermore, each of the additional features and teachings disclosed above may be applied and/or used separately or with other features and teachings in any combination thereof, to provide an improved vehicle seat, and/or methods of making and using the same.

The invention claimed is:

1. A vehicle seat comprising:
   a shield configured to hide an end of a first rotating shaft, wherein the first rotating shaft rotates a seat back with respect to a seat cushion; and
   a cover member being flexible and plate-shaped, wherein:
   the cover member is arranged on a corner portion of a back cover of the seat back for hiding the shield from the front, and wherein the cover member further has an elastic member extending from a lower end of the cover member, and wherein the elastic member is provided in between the cover member and the shield by hooking the elastic member to the shield for the elastic member remains in tension even when the seat back is superimposed on the seat cushion by folding forward.

2. The vehicle seat according to claim 1 further comprises:
   a link member, and
   a second rotating shaft provided with the seat back at a position above the shield and extending in a seat width direction, wherein one end of the link member is rotatably supported by the second rotating shaft, wherein the other end of the link member is connected to the seat cushion, wherein the vehicle seat is configured to be tilt-down, and wherein the cover member is arranged at the corner portion of the back cover of the seat back for covering the corner portion.

3. The vehicle seat according to claim 1, wherein the cover member is formed by placing a flexible core material and a part of the elastic member inside the folded cover material, and sewing the outer circumference of the folded cover material.

4. A vehicle seat system comprising:
   two vehicle seats arranged side by side in a vehicle seat width direction,
   wherein each of the two vehicle seats comprises:
      a shield configured to hide an end of a first rotating shaft, wherein the first rotating shaft rotates a seat back with respect to a seat cushion; and
      a cover member being flexible and plate-shaped,
   wherein the cover member is arranged on a corner portion of a back cover of the seat back for hiding the shield from the front, and wherein the cover member further has an elastic member extending from a lower end of the cover member, and wherein the elastic member is provided in between the cover member and the shield by hooking the elastic member to the shield for the elastic member remains in tension even when the seat back is superimposed on the seat cushion by folding forward, and
   wherein the cover member of each vehicle seat is arranged at each of the corner portions of the adjacent seat backs.

5. The vehicle seat according to claim 1, wherein the cover member is configured to hook at the lower end to the shield by the elastic member tensioned between the cover member and the shield.

6. The vehicle seat according to claim 1, wherein the shield comprises a hook portion formed on a lower end of the shield for hooking a lower end of the elastic member.

* * * * *